United States Patent [19]
Lefebvre et al.

[11] Patent Number: 5,625,236
[45] Date of Patent: Apr. 29, 1997

[54] ELECTRICAL LOAD CONTROLLER TO REGULATE POWER CONSUMPTION

[75] Inventors: Gaston Lefebvre, Sherbrooke, Canada; Réginald Paquin, 109, 2nd. Ave., Lac André,, La Plaine, Quebec, Canada, J0N 1B0

[73] Assignee: Reginald Paquin, Fleurimont, Canada

[21] Appl. No.: 277,095

[22] Filed: Jul. 19, 1994

[51] Int. Cl.$^6$ ...................................................... H02J 1/00
[52] U.S. Cl. ...................... 307/41; 307/38; 364/492
[58] Field of Search ................... 307/38, 39, 40, 307/41, 31, 32, 33, 34, 35; 364/493, 492

[56] References Cited

U.S. PATENT DOCUMENTS

| | | | |
|---|---|---|---|
| 4,125,782 | 2/1977 | Pollnow, Jr. | 307/35 |
| 4,168,491 | 9/1979 | Phillips et al. | 307/39 |
| 4,293,915 | 11/1981 | Carpenter et al. | 364/493 |
| 4,349,879 | 9/1982 | Peddie et al. | 364/492 |
| 4,357,665 | 11/1982 | Korf | 364/492 |
| 5,216,357 | 6/1993 | Coppola et al. | 324/142 |

*Primary Examiner*—William M. Shoop, Jr.
*Assistant Examiner*—Jonathan S. Kaplan

[57] ABSTRACT

An electrical load controller circuit for controlling power consumption is described. A detection circuit detects the current flowing through a supply line and produces an output signal representative thereof. A comparator circuit compares the output signal with an adjustable reference signal which is indicative of the maximum power to be consumed by loads connected to the supply line. All of the loads are connected to switching circuits, and these are enabled and disabled by signals received from a decade counter which is in turn controlled by inverters and timer circuits whereby loads can be placed in service in a sequential manner. A modulator intermittently controls the time periods that the electrical load is connected to the supply line as well as the ON and OFF periods of the loads for daytime or nighttime operation.

12 Claims, 5 Drawing Sheets

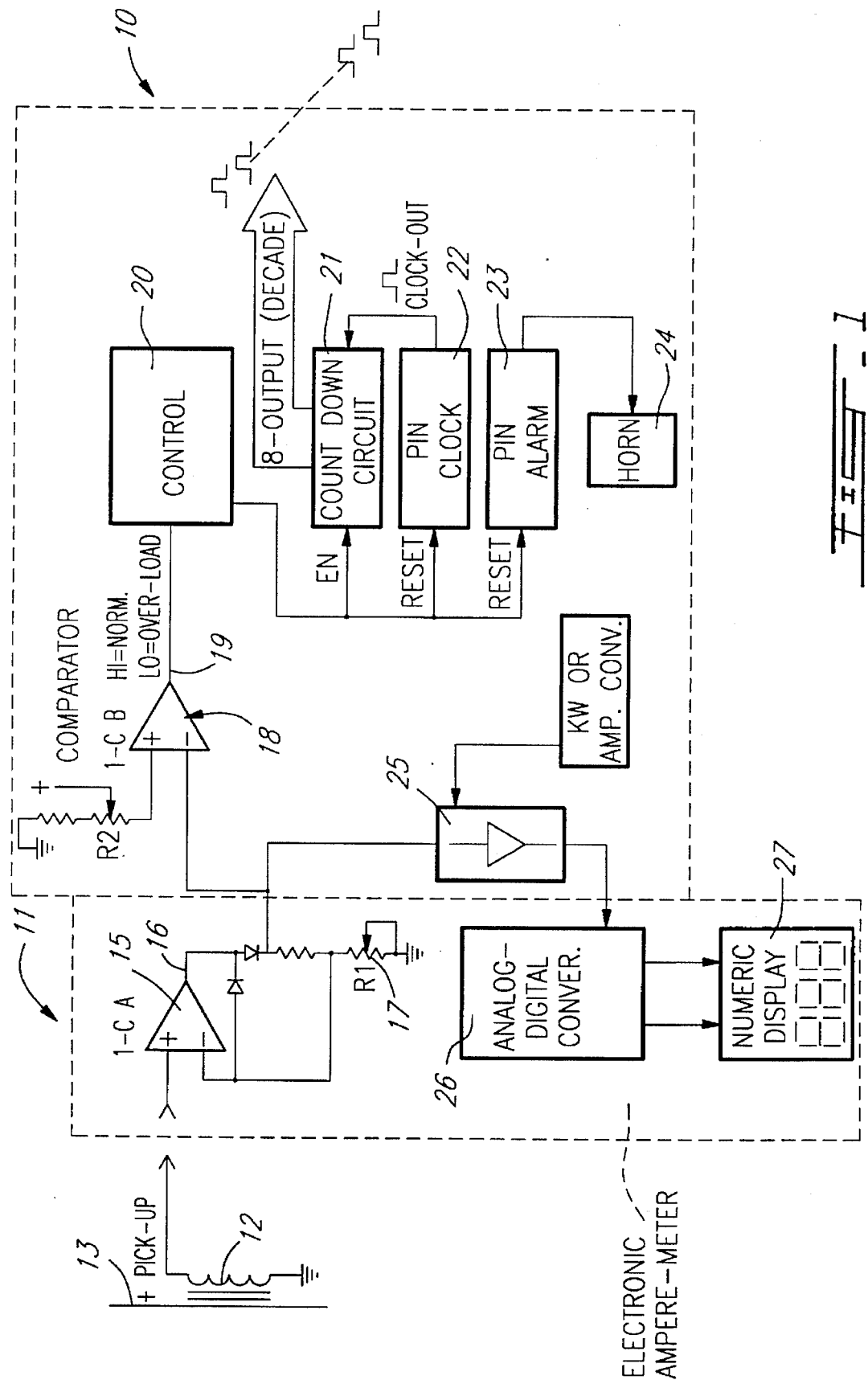

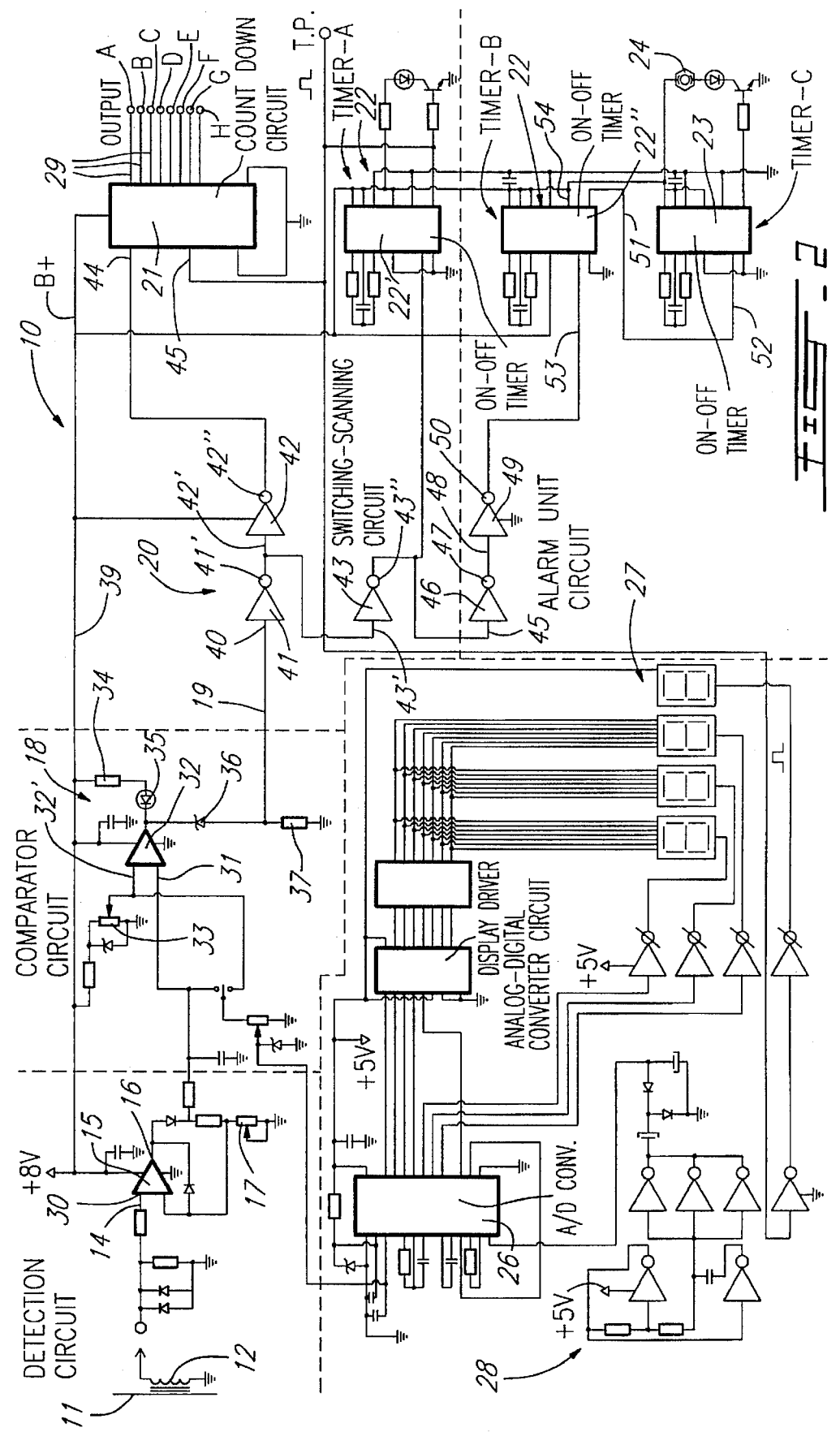

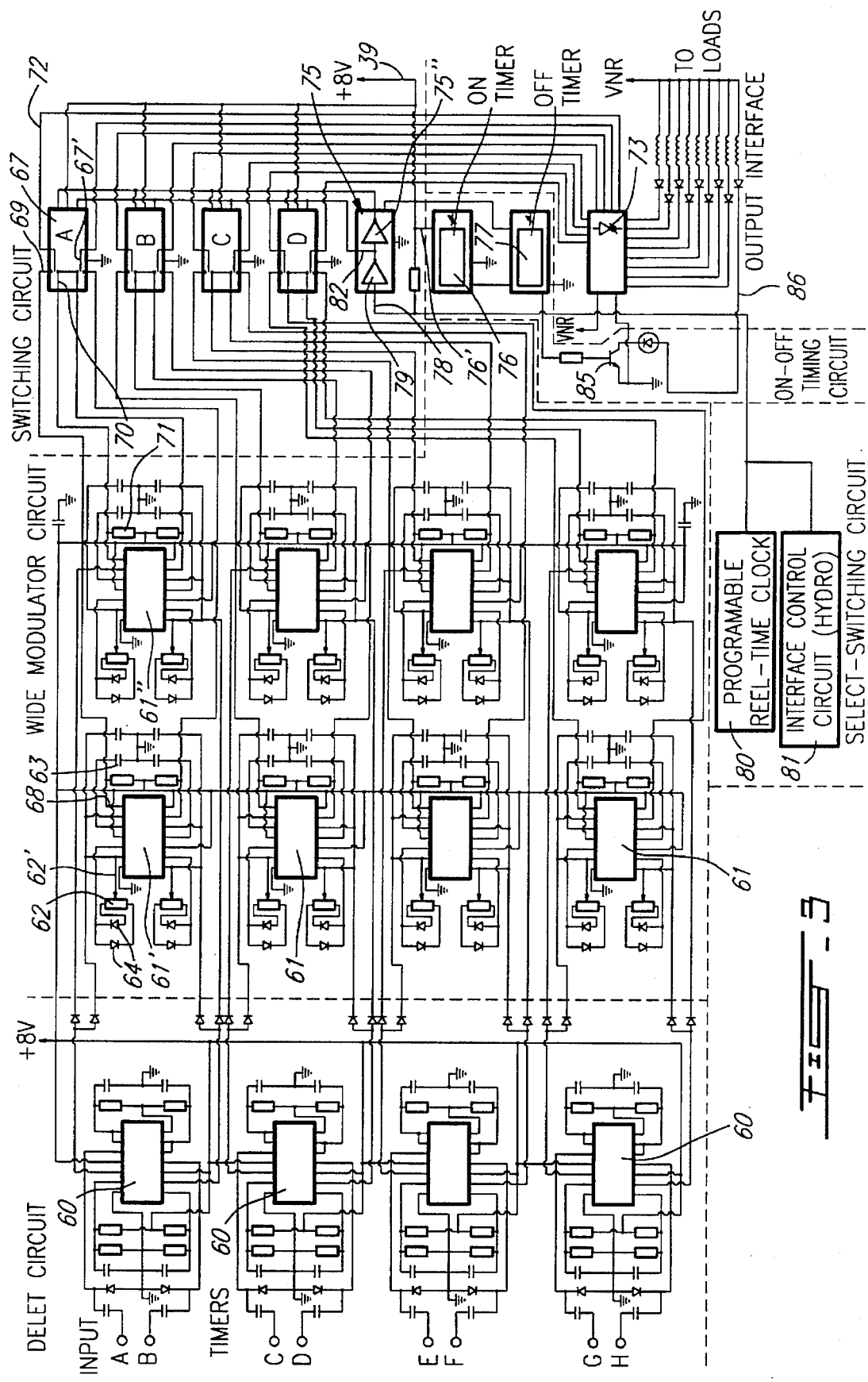

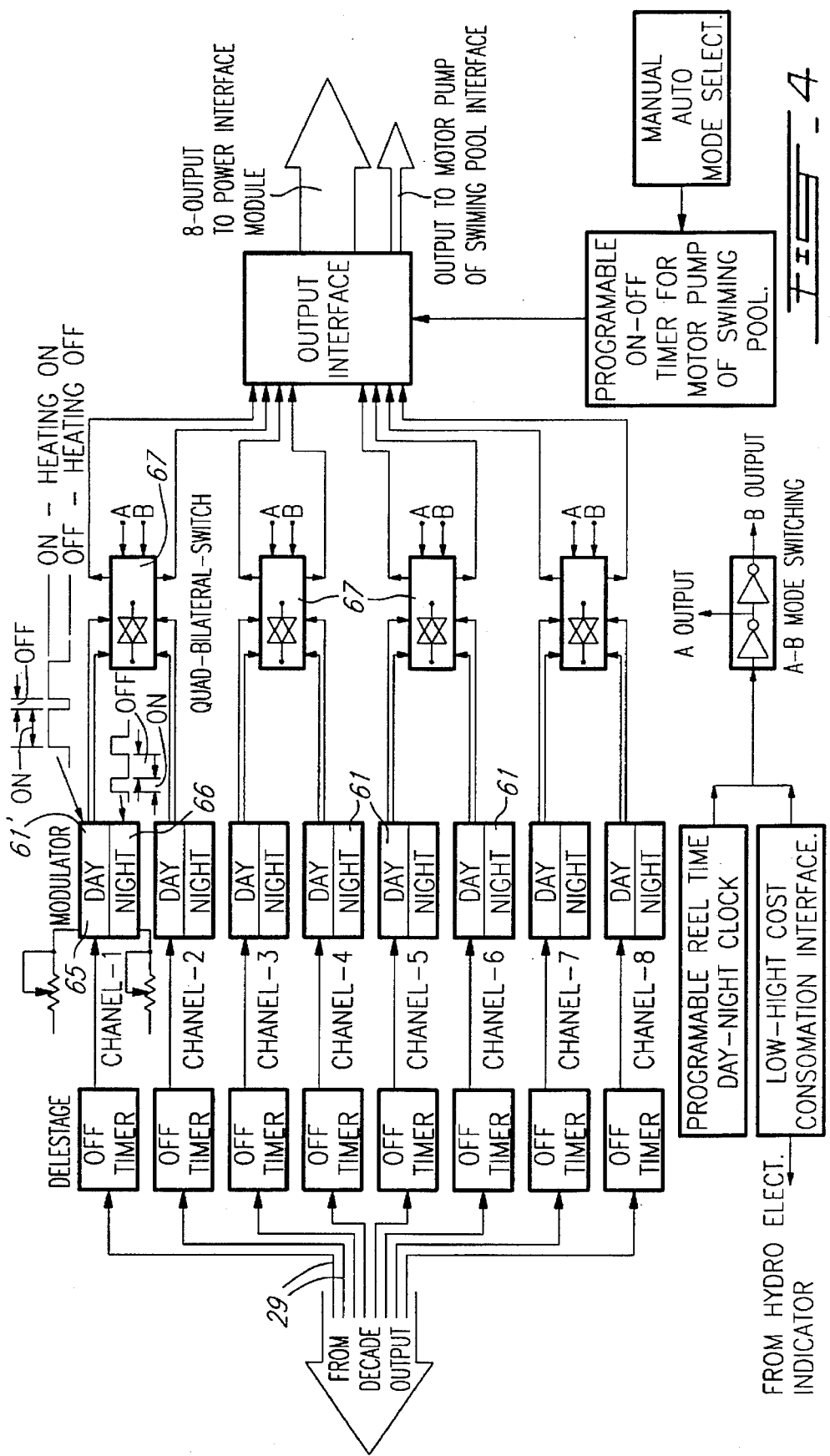

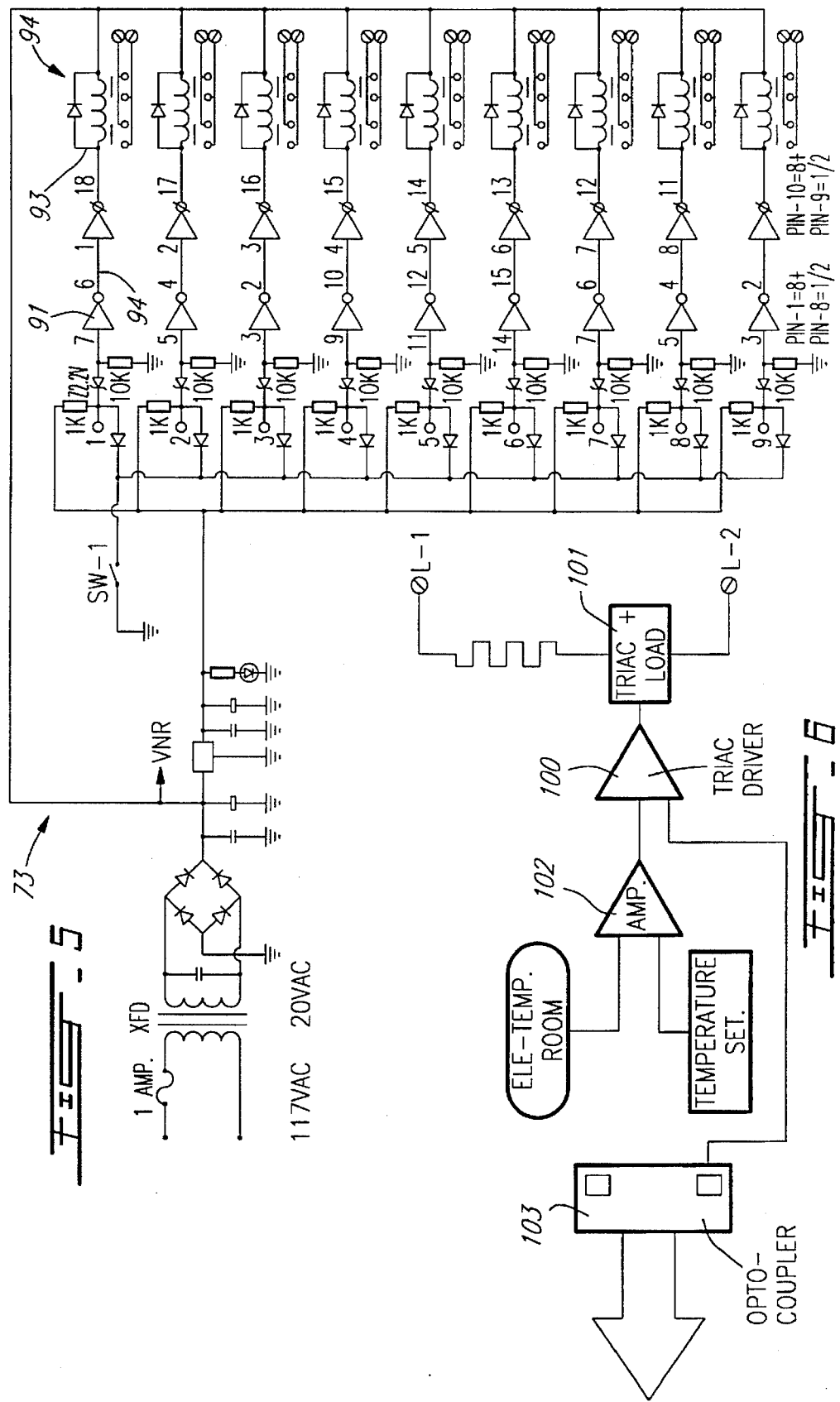

5,625,236

1

ELECTRICAL LOAD CONTROLLER TO REGULATE POWER CONSUMPTION

TECHNICAL FIELD

The present invention relates to an electrical load controller circuit for controlling power consumption, and particularly domestic power consumption wherein the total consumption of loads may be fixed at a desired preset value, operated in modulated modes and further wherein loads may be placed back in service in a sequential manner not to overload distribution networks.

BACKGROUND ART

It is known in the prior art to provide load demand controllers for connecting and disconnecting loads from a power source and some of these devices, such as described in U.S. Pat. No. 4,125,782, use a microprocessor which is programmed to input data from switches on a control panel and output data to a set of circuits which operates loads. This patent also teaches the control of power consumption by selectively shedding loads. U.S. Pat. No. 4,357,665 also describes a programmable electronic real-time load controller device. It is also known in the prior art to control loads distributed to a plurality of load consuming customers, and such circuits are controlled by the electrical power distribution company.

One disadvantage of known prior art controllers is that when there is a power failure and power comes back on the distribution line, all of the loads of the consumers are immediately branched back to the distribution line, and this can cause a further power failure. Still further, most of these controllers do not provide adjustable means for the consumer to vary the time cycles that individual loads are placed in operation as well as the time cycles of intervals of actuation of such loads. Another disadvantage of some of the prior art is that the switching circuits do not take into account the cost of electricity during peak periods, when the cost is higher than other periods, and does not utilize real-time inputs to minimize power consumption during such high cost periods.

SUMMARY OF INVENTION

It is a feature of the present invention to provide an electrical load controller to regulate power consumption and which substantially overcomes some of the above-mentioned disadvantages of the prior art and which provides additional features resulting in energy-efficient use.

Another feature of the present invention is to provide an electrical load controller to regulate power consumption and wherein loads can be placed back in service in a controlled sequential manner while automatically monitoring total power consumption with respect to a preset maximum power consumption value.

Another feature of the present invention is to provide an electrical load controller to regulate power consumption and wherein the time periods of use and non-use of electrical loads are adjustable for both day and night uses, and further wherein the time period that the electrical load is connected to the supply line is intermittently controlled.

According to the above features, from a broad aspect, the present invention provides an electrical load controller circuit for controlling power consumption. The controller circuit comprises a detection circuit connected to an electrical supply line and has a redresser amplifier with an adjustable gain to produce an output signal representative of the

2 amperage flowing through the supply line. A comparator circuit is connected to the output signal of the detection circuit and has a reference signal for comparison with the output signal. A switching circuit network is connected to the comparator circuit and has inverting circuit means operable when the output signal exceeds the reference signal. The switching circuit has a pulse generating timer circuit and is connected to a decade counter for controlling same. The decade counter has a plurality of outputs for controlling switching means each associated with one or more electrical loads to connect and disconnect the electrical supply line therefrom. The timer circuit provides clock signals to the decade counter to actuate the switching means associated with the plurality of outputs in a sequential manner at regular time intervals as long as the output signal from the detection circuit is below the reference signal. Modulating means is provided to intermittently control the time periods that the electrical loads are connected to the supply line.

BRIEF DESCRIPTION OF DRAWINGS

A preferred embodiment of the present invention will now be described with reference to the accompanying drawings, in which:

FIG. 1 is a block diagram showing the detection part of the controller together with the decade counter to which electrical loads are connected through switching circuits;

FIG. 2 is a detailed schematic diagram illustrating the construction of the block diagram shown in FIG. 1;

FIG. 3 is also a detailed schematic diagram showing the construction of the switching circuit connected between the output of the decade counter and the power consuming loads;

FIG. 4 is a simplified block diagram of FIG. 3;

FIG. 5 is a detailed schematic diagram showing the detailed construction of the interface circuit which operates the load relays; and FIG. 6 is a block diagram of an alternative electronic switching circuit to the interface switching circuit shown in FIG. 5.

DESCRIPTION OF PREFERRED EMBODIMENTS

Referring now to the drawings and more particularly to FIG. 1, there is shown the detection and scanning circuit of the electrical load controller 10 of the present invention for controlling power consumption, such as in a domestic household. The controller detection and scanning circuit 10 comprises a detection circuit 11 and has a current transformer provided with a pick-up coil 12 coupled to a power supply line 13 to provide a voltage signal on input 14 of a redresser amplifier 15. At the output 16 of the redresser there is generated an output signal representative of the amperage flowing through the supply line 13. The redresser amplifier has an adjustable gain provided by the resistor 17.

The output 16 of the redresser 15 is connected to a comparator circuit 18 which provides at its output 19 signals indicative of excess power consumption (i.e., above the preset value), and feed its output signals to a control circuit 20, which will be described later, which in turn controls a step switching circuit 21 and a timer network 22 which provides clock pulses to the step switching circuit 21. A further timer circuit 23 is connected to an alarm 24.

As further shown in FIG. 1, the output signal at the output 16 of the redresser 15 is also connected to a converter circuit 25 capable of providing signals to an analog digital converter 26 representative of the kilowatt present or being consumed on the power line 13, or amperage flowing through the power line 13. The output of the converter 26 is connected to a numerical display device 27 to visually display a value representative of the kilowatts or amperage being consumed by loads connected to the power line 13.

Referring now to FIG. 2, there is shown a detailed schematic diagram of the construction of a block diagram shown in FIG. 1. The input coil 12 is connected to the power line 11 at the entrance of the distribution box as commonly found in industrial or domestic building structures- The circuit as shown in FIG. 2 incorporates a power supply 28 which provides a negative output supply to feed the analog digital converter 26. It is of simple circuit construction and there is no need to describe it in detail herein. The circuit as shown at 10 can be referred to as a scanning circuit and permits the control of loads connected to the outputs 29 of the step switching circuit 21 to be connected and disconnected by controlling switching circuits. These loads can be switched off temporarily when the load consumption exceeds a preset value as detected by the comparator circuit 18.

The current flowing in the coil 12 of the current transformer is monitored by connecting the voltage at the output of the coil to the non-inverting input 30 of the amplifier 15, and this voltage signal has approximately 1 millivolt for each ampere of current flowing in the coil 12. Seeing that this voltage signal is an alternating signal, the amplifier 15 is connected in such a way as to be capable of redressing a single cycle of this signal. The gain of the amplifier 15 is adjusted by the resistor 17, as previously described.

At the output 16 of the amplifier 15 there is present a voltage signal of 1 millivolt for each ampere of current flowing in the coil 12. That is to say, if there is a power consumption of 1 ampere, we will have a 1-millivolt signal at the output 16. If the power consumption is 5 amperes, then the output signal is 5 millivolts. Accordingly, the value of this signal at the output of the redresser amplifier 15 is representative of the amperage being consumed.

The output 16 of the inverter 15 is connected to the input 31 of the inverter 32 of the comparator circuit 18. This is the inverter input of the comparator. To the other non-inverted input 32', we apply a reference voltage which is adjustable by resistor 33 in order to have a reference voltage. For example, if we set the reference voltage at 50 millivolts, this will represent a limit of 50 amperes which may be drawn through the line 11, which is the limit that we do not want the loads to exceed. As long as the signal voltage on the input 31 remains inferior to 50 millivolts, which is the reference signal, the inverter 32 or comparator circuit 18 will not intervene on the operation of the power distribution system.

At the output of the inverter 32 there is connected a resistor 34 in series with diode 35 and diode 36 and resistor 37 which act as a voltage divider connected between the B+ supply line 39 and ground. This provides a voltage of approximately 5 to 9 volts to the input 40 of the inverter circuit network 20. Once the input voltage at the input 31 of the inverter 32 exceeds the preset reference current value of 50 amperes, the output of the inverter 31 will cause the diode 36 to conduct and provide ground to the light emitting diode 35. At that time the voltage on the input 40 of the inverter 41 is down to 0.2 volts. The light emitting diode provides a visual signal to advise that the preset maximum power consumption value has been exceeded. Resistor 34 is a current limiting resistor connected to the B+ circuit supply line.

The inverters 41 and 42 as well as inverter 43, and the integrated "ON/OFF" timer circuit 22' constitute a pulse generator which permits the step switching circuit 21 to function or not. This is achieved as follows. When there is a voltage of 5.9 volts at the input 40 of the inverter 41 this provides a 0 volt or 0 logic signal on its output. Because the output 41' is directly connected to the input 42' of the inverter 42, the output 42" of the inverter 42 is at the B+ voltage value, which is a logic 1 signal, and this B+ signal is applied to the input 44 of the decade counter 21. Accordingly, the step switching circuit is enabled, and the decade counter cannot advance even if there was an input pulse on its clock input 45.

Under normal conditions when the input 40 of the inverter 41 is at 5.9 volts, its output 41' is at a low value (logic 0) and this is connected to the input 42' of the inverter 42, and the output 42" of the inverter 42 is high (logic 1), and therefore applying an 8-volt signal to the input 44 of the step switching circuit. The input 44 is the enabled input of the step switching circuit to permit its operation or interruption.

The output of the inverter 41 is also connected to the input 43' of inverter 43. Because the input 43' is at a logic 0, the output 43" of the inverter 43 will be at a logic 1 which will be in the order of about 8 volts. This output 43" is directly connected to the input 44 of the "ON/OFF" timer circuit 22'. The output 43" of the inverter 43 is also connected to the input 45 of a further inverter 46. Because the input 45 is at a positive logic signal, we find a low logic signal at the output 47 of the inverter 45, and this output is connected directly to the input 48 of a further inverter 49 at the output 50 of which we will find a positive logic signal. This output 50 is connected directly to a second "ON/OFF" timer circuit 22" and its output 51 is connected directly to the output 52 of the further "ON/OFF" timer circuit 23. It can also be seen that the timer 22' and 23 are connected in an oscillator mode configuration due to the fact that the inputs 44 and 52 of these two timers have a positive logic signal. After a predetermined count the inputs 44 and 56 are grounded and the counter is reset, and again after a predetermined time limit, the counter will switch on again, etc. The input 53 of timer circuit 22' is at 0 logic, and thus acts merely as an "ON/OFF" timer because its output 54 is connected to the positive supply. When the signal at the output 8 of timer 22" is at logic 1, and because it is connected to the input 52 of the timer 23, it will disable the timer 23 and prevent oscillations from taking place.

The functions of the three timers 22', 22" and 23, are: the timer 22 acts as a pulse generator that causes the step switching circuit 21 to advance, the timer 22" is simply a stand-by timer; and the timer 23 is another pulse generator but this one serves simply to feed the alarm circuit 24.

Going back to the description of the inverter 41, when we are in a normal mode, that is to say, when the current detected by the current transformer coil 12 does not exceed the reference signal value at the input 32' of the inverter 32, the input 40 at that time is at a logic 1 with a signal of approximately 5.9 volts and the output 41' is at a 0 logic level. The output 42" of the inverter 42 is therefore at a high logic level connecting a signal of approximately 8 volts to the enabled input 44 of the decade counter causing the decade counter to stop counting. At that same time the input 43' of the inverter 43 maintains its output 43" at a high logic level and maintains the input 44 of the timer 22' at a high logic level, therefore disabling the timer 22'. When the signal at the input 40 of the inverter 41 is reversed, it passes to a low logic level of approximately 0.2 volts indicating an overload condition. The process reverses and the decade counter is enabled and will receive a first positive input clock pulse on its input 45. Because the output 41' of the inverter 41 is at a high logic level, near 8 volts, the inverter 43 has a high logic level at its input and a low level logic signal would appear at its output 43" causing the timer to operate. At the same time this low logic signal will be applied to the input 45 of inverter 46, and this will cause a low voltage signal to appear at the output 50 of inverter 49. The reason for the two inverters in series is to provide a better filtered output and to prevent parasitic noises thus providing a better trigger signal for the two timers.

The fact that the input 53 of timer 22' is enabled, this timer will place itself in a counting mode. This timer had its frequency adjusted as well as its counting mode. An internal oscillator is provided in these timer circuits and they operate for 3 to 4 minutes approximately before its output 51 is placed at a low logic signal value. That is to say, there is a 3- to 4-minute time lapse period before the output changes, and therefore the output 51 is maintained at a high logic level during this period of time. Because the output 51 is at high logic value during the counter time period, the timer 23 is maintained inoperative. The reason for this is simply that the switches connected to the outputs 29 of the decade counters have been switched off and the power disconnected from the loads.

If a surcharge is still present at the input of the detector circuit 11 wherein the input signal from the coil 12 exceeds the reference signal, then the reason for this may be that the reference signal set by the consumer is too low or there is a problem with the wiring of switches to the loads. The reference signal may be too low, if it is set below the load consumption of certain household appliances, such as the hot water heater, stove, etc., which usually demand 30 to 35 amperes. When this repetition in the setting of the decade counter occurs, the alarm 24 will be actuated giving an audible alarm advising the customer or consumer that there is something abnormal with the circuit, or the reference signal should be readjusted to a higher level.

When the input 40 the inverter 41 is in the overload position and has a low logic input signal, the output 42" of the inverter 42 has a high voltage or positive logic signal and renders the step switching circuit operable as well as the timer 22'. After 3 seconds the timer 22' will apply a first impulse on the clock input 45 and the fact that the input 44 is operational will cause the step switching circuit to advance one step to place the output line A in a positive mode and also to permit the actuation of a first switching circuit to disconnect the load connected thereto. If after the switching action there is a decrease in the current consumed below the adjustable reference signal value, the process will invert with the output of the inverter 33 not being placed to ground, we will again find the normal signal value at the input 40 of the inverter 41 and the output 42' of the inverter will be at a low logic value and the load will be reconnected.

However, if after the step switching circuit has advanced one step placing the output circuit A connected in a switching mode, and the detected current by the coil 12 has not lowered below the limit of the preset value, the step switching circuit 21 is maintained operational as well as the timer 22', and after 3 more seconds a second clock pulse is applied to the input 45 of the step switching circuit 21 causing it to advance another step to its output line B to cause another switching operation to disconnect another load. This function continues on until the detected current value is below the preset value.

Referring now to FIG. 3, there is shown the detailed construction of the switching circuits associated with a plurality of electrical loads to be controlled. As herein shown, the switching circuits 60 are switched on to connect electrical power to their loads as long as the consumption of the circuit does not exceed the preset value. These switching circuits 60 permits the normal operation of the modulator circuits 61. These modulator circuits 61 are ON/OFF integrated timer circuits. These circuits have an "ON" period which is adjustable by the variable resistance 62. As can be seen, from the modulator circuit 61' at the top of the schematic diagram, the potentiometer 62 together with the capacitor 63 determines the operational period and consequently the oscillation frequency of the circuit. Seeing that we utilize a very low frequency, the potentiometer 62 has a high resistive value and the resistor and capacitor constitute an RC circuit. With this RC circuit we can obtain an "OFF" period of operation of the modulator circuit which is different from the "ON" period, and the fact that two diodes 64 are utilized in this circuit, and connected to a common point to the modulator circuit 61, which is the output of the "kept" and connected across the potentiometer 62, there is provided a 3-minute interval between each oscillation. Instead of placing the integrated circuits, namely modulator circuit 61', 3 minutes "ON" and 3 minutes "OFF", and so on, as is normal, at that time the integrated circuit will have, depending on the position of the cursor 62' of the potentiometer 62, an "ON" time period of approximately 1 minute and a 2-minute "OFF" period over the same period of oscillation, that is to say, on the same period of oscillation at the output of the counter which is in a high or low mode.

Referring additionally to FIG. 4 which is a simplified block diagram of FIG. 3, and at the top of the drawing, there is shown control pulses of an example of an output that is placed during a certain time mode in an "ON" state and in an "OFF" state during another time period over the same period of modulation. As can also be seen, the modulator has a day mode 65 and a night mode 66, and it can be seen that the "ON" period of the day mode is different from that of the night mode, and these can be adjusted by the potentiometer 62. Accordingly, the modulation in one mode can be different from that of the other mode. By period, we are referring to time periods, that is to say, the time during which the output of the oscillator is in the high or low mode.

In order to determine if the output signal from the modulator circuit 61' is a day or night mode, we utilize quad-bilateral switches 67 at the output of these modulators. Referring again to FIG. 3, we can see that the output 68 from the modulator circuit 61' is connected to a first input 69 of the switch 67 while the second input 70 is connected to the output 71 of a further modulating circuit 61". Bilateral switches are switches having two inputs 69 and 70 and one output 72. These switches are also electronic switches thereby eliminating mechanical relay. If the controller is in a high mode of operation or a low mode of operation, one of these inputs 69 or 70 is connected to the output 72. All of the outputs of the bilateral switches are connected to an interface circuit 73 which permits the operation of high voltage circuits, as illustrated in FIG. 5.

As shown in FIG. 3, an inverter circuit 75 comprising two inverters 75' and 75" is connected to the bilateral switches 67 and to an "ON" timer circuit 76 and an "OFF" timer circuit 77. A high logic level signal is applied to the input 78 of the inverter 75 through a coupling resistance 79 which is connected to the B+ supply line 39. The input 78 is maintained close to the 8-volt B+ line. The input 78 is also connected to a real-time programmable clock 80 in which we can program the hours at which we want the inverter circuit to send a signal to the bilateral switch to change the position of its switch arm 67' to switch between the night and day cycles. Also connected to the input of the inverter 75 may be an interface control circuit 81 as may be provided by the hydro company, which circuit provides an indication, by such means as a red light, indicating that the tariff or cost of electricity during that moment is higher than normal tariffs. When that circuit 81 provides a signal indicative of the high tariff, the circuits can be arranged to control the modulators, the interface circuit, the programmer or the time clock to switch off part or most of the loads connected to the supply line or selected ones of the high power consuming loads. By grounding the input 78 of the inverter 75, the first output 82 will place itself in a high mode and this will cause the bilateral switches 67' to switch to their input 69. If at the input 78 of the inverter 75 we have a positive voltage, the output 82 will become low (0 volt) which places the switch 67' in its other position. In other words, the bilateral switch acts as a flip-flop. Accordingly, the switching circuit can be placed to a night or day mode of modulation. The two timers 76 and 77 are also mounted in an oscillator configuration. When a high logic level signal is present at the output 76' of the "ON" timer 76, the timer interferes and operates the transistor 85 which interferes with a circuit (not shown) but leading to another power source through its connection 86, such source being, for example, a motor of a pump or a pool pump. After the "ON" period of the timer 76 expires it causes the "OFF" timer 77 to operate and causes the transistor 85 to depolarize.

Referring now to FIG. 5, there is shown the construction of the interface circuit 73. This is the circuit that operates the power relays 90 which connect and disconnect the power supply to the loads. The interface circuit is a system composed of individual circuits formed by an inverter 91 connected in series with a switching transistor 92 which in turn provides the supply to the coil 93 to actuate the relay 90. These switching circuits are operated by low logic signals applied to the input of the inverters 91. If there is 0 volt at the input of the transistor 92, then the relays will not function. When one of the inputs is placed in a modulating state or in a switched-off state, we provide a 0 voltage level signal at the input of the inverter 91 and its output 94 thus switches to a high logic signal which causes the transistor 92 to operate and drive the relay 90. The input of the inverter is placed to 0 level or ground through the Zener diode.

FIG. 6 shows an alternative switching circuit to FIG. 5 and wherein triacs 100 are utilized as switches for the loads 101. The triac is operated by an amplifier 102 and driven by signals received from the opto-coupler 103 which isolates the high voltage circuit from the electronic control circuit. The signals are received by optical signals. This circuit is obvious to a person skilled in the art and need not be described later It is pointed out that the switching timers 61 which control the switching circuit are configured in such a way such that when there is an interruption of current in the controller at the moment when the controller switches back the voltage, automatically these timer circuits reset before permitting the load circuits to be placed back in function. It is also pointed out that the modulating circuit permits the control of temperature much more precisely than a single thermostat, of a conventional temperature control system, and for each room in a building structure. By the provision of the modulating circuit, it is possible to control the loads, such as resistive heating elements, in an intermittent mode. With the present controller it is possible to obtain a visual display of the amperage or kilowatt consumption of the circuit, the consumer adjusts his own desired comfort consumption level, and the loads are placed back in service in a sequential manner when there is a power failure. The loads are controlled by modulators independently and in a different manner during periods of the day, permit low consumption during high tariff periods, can also control individual rooms of a building, and have a real-time clock incorporated therein which can automatically manage various loads connected to the circuit. The loads may be baseboard electrical heaters which are high energy consumption loads.

The apparatus is also programmable to limit the current consumption below preset tarrifs of the utility and during certain periods of time in a day. For example, if the tarif is 0.04¢/km the controller will control the level of modulation to limit the current consumption to 60 amperes. If the tarrif is 0.06¢/km or 12¢/km, the current consumption will not exceed 50 amperes or 40 amperes, respectively.

It is within the ambit of the present invention to cover any obvious modifications of the preferred embodiment described herein provided such modifications fall within the scope of the appended claims.

We claim:

1. An electrical load controller circuit for controlling power consumption, said controller circuit being secured to a domestic electrical distribution box to which an electrical supply line is connected, said controller circuit comprising a detection circuit connected to said electrical supply line and having a redresser amplifier with an adjustable gain to produce an output signal representative amperage flowing through said supply line, a comparator circuit connected to said output signal of said detection circuit and having a reference signal for comparison with said output signal, said reference signal being an adjustable reference signal indicative of a maximum preset power consumption of loads connected to said supply line, a switching circuit network connected to said comparator circuit and having inverting circuit means operable when said output signal exceeds said reference signal, said switching circuit network incorporating a pulse generating time circuit which is connected to a step switching circuit for controlling said step switching circuit, said step switching circuit having a plurality of outputs for controlling switching means each associated with one or more electrical loads to connect and disconnect said electrical supply line thereto, said timer circuit providing clock signals to said step switching circuit to actuate said switching means associated with said plurality of outputs in a sequential manner at regular time intervals as long as said output signal is below said reference signal, and modulating means to intermittently control time periods that said electrical loads are connected to said supply line, said switching means associated with said electrical loads comprises timing circuits receiving at inputs thereof said plurality of outputs of said step switching circuit, said input timer circuits being connected to said modulating means, said modulating means having adjustable ON-OFF timers for actuating and deactuating power switches connecting said supply line to said electrical loads, thereby controlling time periods that said supply line is connected to said electrical loads, said modulator circuit being provided with two sets of ON-OFF timers which are independently programmed to have different "on" and "off" time periods dependent on daytime or nighttime operation.

2. An electrical load controller circuit as claimed in claim 1 wherein said ON-OFF timers are independently programmed by oscillator output signals and said periods of time are fixed by a variable potentiometer.

3. An electrical load controller circuit as claimed in claim 1 wherein said power switches are electronic bilateral switches having two inputs and a common output.

4. An electrical load controller circuit as claimed in claim 3 wherein said electronic bilateral switches are all connected to an interface circuit having power switching transistors to control switching relays to connect power to said loads.

5. An electrical load controller circuit as claimed in claim 4 wherein said electronic bilateral switches are controlled by a programmable real-time clock circuit in which the time of day is programmed to effectuate a switching operation of said bilateral switches at predetermined times.

6. An electrical load controller circuit as claimed in claim 5 wherein said bilateral switches are also controlled by an interface ON-OFF timing circuit for switching off said bilateral switches during high cost power consumption time periods and for controlling other power consuming loads.

7. An electrical load controller circuit as claimed in claim 6 wherein said ON-OFF timing circuit comprises a flip-flop IC circuit, an ON timer circuit and an OFF timer circuit.

8. An electrical load controller circuit as claimed in claim 1 wherein loads comprise electrical heating devices and domestic power consuming appliances provided in a plurality of rooms in a building structure.

9. An electrical load controller circuit as claimed in claim 1 wherein said inverting circuit means comprises a plurality of inverters connected to an output inverter circuit of said comparator circuit and providing enabling logic signals to said step switching circuit and said pulse generating timer circuit.

10. An electrical load controller circuit as claimed in claim 9 wherein said pulse generating timer circuit is comprised of three ON-OFF timers.

11. An electrical load controller circuit as claimed in claim 1 wherein an alarm circuit is connected to said pulse generating timer circuit.

12. An electrical load controller circuit as claimed in claim 6, wherein said ON-OFF timing circuit are controlled in accordance with preset current consumption limits set in accordance with the cost factors set by utility.

* * * * *